(12) United States Patent
Heckmann et al.

(10) Patent No.: US 11,603,115 B1
(45) Date of Patent: Mar. 14, 2023

(54) METHOD FOR OPERATING AN ASSISTANCE SYSTEM

(71) Applicant: MERCEDES-BENZ GROUP AG, Stuttgart (DE)

(72) Inventors: Alexander Heckmann, Radolfzell (DE); Uli Kolbe, Engen (DE); Volker Oltmann, Calw (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/796,317

(22) PCT Filed: Nov. 27, 2020

(86) PCT No.: PCT/EP2020/083604
§ 371 (c)(1),
(2) Date: Jul. 29, 2022

(87) PCT Pub. No.: WO2021/151555
PCT Pub. Date: Aug. 5, 2021

(30) Foreign Application Priority Data

Jan. 30, 2020 (DE) ...................... 10 2020 000 593.4

(51) Int. Cl.
*B60W 60/00* (2020.01)
*B60W 30/18* (2012.01)
(Continued)

(52) U.S. Cl.
CPC ......... *B60W 60/0015* (2020.02); *B60Q 9/008* (2013.01); *B60W 10/182* (2013.01);
(Continued)

(58) Field of Classification Search
CPC ......... B60W 60/0015; B60W 60/0013; B60W 10/182; B60W 30/09; B60W 30/0956;
(Continued)

(56) References Cited

U.S. PATENT DOCUMENTS 9,063,546 B2 6/2015 Hauler et al.
9,227,631 B2 1/2016 Kammel et al.
(Continued)

FOREIGN PATENT DOCUMENTS

DE 102011086241 A1 5/2013
DE 102012217002 A1 3/2014
(Continued)

OTHER PUBLICATIONS

International Search Report dated Feb. 18, 2021 in related/corresponding International Application No. PCT/EP2020/083604.
(Continued)

*Primary Examiner* — Hussein Elchanti
(74) *Attorney, Agent, or Firm* — Patent Portfolio Builders PLLC

(57) ABSTRACT

A method for operating an assistance system for automated driving operation of a vehicle involves continuously determining an emergency trajectory along which the vehicle is brought to a standstill in a longitudinally and transversely controlled manner after activation of an emergency operation of the vehicle. In the event of an imminent or already initiated lane change of the vehicle from a starting lane to a target lane according to a determined standard trajectory, a decision is made as to whether the vehicle should be brought to a standstill in the starting lane or in the target lane when emergency operation is activated. This decision depends on the position of the vehicle on the standard trajectory. The vehicle is then brought to a standstill in the starting lane if an emergency trajectory is planned by means of which the vehicle is brought to a standstill in the starting lane within a predefined path length and/or within a predefined time period, and if in the process a predefined comfort value of a transverse acceleration acting on the vehicle is not
(Continued)

Figure 1:
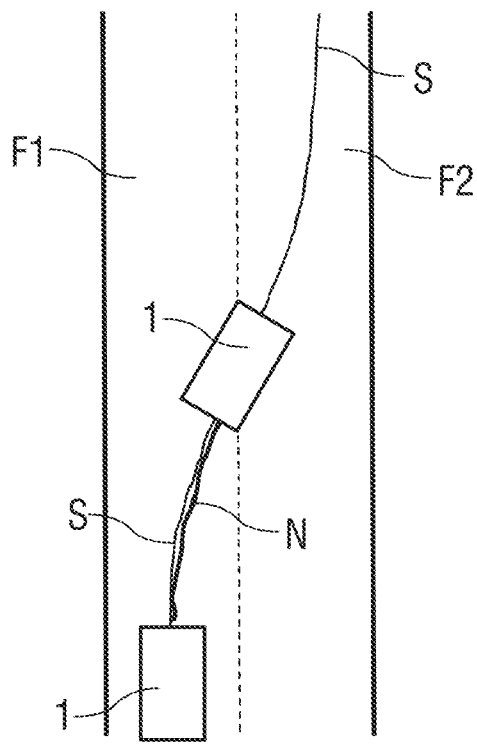

exceeded and a predefined penetration depth of the vehicle into the target lane is not exceeded.

7 Claims, 2 Drawing Sheets

(51) Int. Cl.
*B60W 30/09* (2012.01)
*B60W 30/095* (2012.01)
*B60W 40/04* (2006.01)
*B60W 10/18* (2012.01)
*B60Q 9/00* (2006.01)

(52) U.S. Cl.
CPC ........ *B60W 30/09* (2013.01); *B60W 30/0956* (2013.01); *B60W 30/181* (2013.01); *B60W 30/18163* (2013.01); *B60W 40/04* (2013.01); *B60W 60/0013* (2020.02); *B60Q 2800/10* (2022.05); *B60W 2556/60* (2020.02)

(58) Field of Classification Search
CPC ......... B60W 30/181; B60W 30/18163; B60W 40/04; B60W 2556/60; B60Q 9/008; B60Q 2800/10
See application file for complete search history.

(56) References Cited

U.S. PATENT DOCUMENTS

| | | | | |
|---|---|---|---|---|
| 9,393,967 | B2 | 7/2016 | Hauler | |
| 9,775,004 | B2* | 9/2017 | Cawse | ................ G08G 1/0112 |
| 10,627,825 | B2* | 4/2020 | Gutmann | .............. B60W 30/16 |
| 2005/0015203 | A1* | 1/2005 | Nishira | ................ B60W 50/16 |
| | | | | 340/436 |
| 2010/0161192 | A1* | 6/2010 | Nara | ............... B60W 30/18145 |
| | | | | 701/1 |
| 2017/0018189 | A1* | 1/2017 | Ishikawa | ............ B62D 15/0255 |
| 2017/0136842 | A1* | 5/2017 | Anderson | ............ B60N 2/0244 |
| 2017/0336797 | A1* | 11/2017 | Abe | ................... G02B 27/0179 |
| 2018/0194364 | A1 | 7/2018 | Asakura et al. | |
| 2018/0354510 | A1* | 12/2018 | Miyata | ............ B60W 60/00276 |
| 2018/0354518 | A1* | 12/2018 | Inou | ................ B60W 60/00272 |
| 2019/0071099 | A1* | 3/2019 | Nishiguchi | ........ B62D 15/0255 |
| 2019/0072970 | A1* | 3/2019 | Izumori | ................. G05D 1/0257 |
| 2019/0084572 | A1* | 3/2019 | Oishi | ....................... B60Q 1/34 |
| 2019/0143983 | A1* | 5/2019 | Hashimoto | ........... B60W 10/20 |
| | | | | 701/23 |
| 2019/0329780 | A1* | 10/2019 | Tomescu | ................ G08G 1/162 |
| 2020/0050195 | A1* | 2/2020 | Gross | ................. G05D 1/0242 |
| 2020/0148204 | A1* | 5/2020 | Kunz | .................. B60W 30/162 |
| 2020/0398849 | A1* | 12/2020 | Kanoh | ..................... G08G 1/16 |

FOREIGN PATENT DOCUMENTS

| | | |
|---|---|---|
| DE | 102013213169 A1 | 1/2015 |
| DE | 102015003124 A1 | 9/2016 |
| DE | 102017011808 A1 | 6/2019 |
| EP | 3632761 A1 | 4/2020 |
| WO | 2018216333 A1 | 11/2018 |

OTHER PUBLICATIONS

Office Action created Jul. 1, 2020 in related/corresponding DE Application No. 10 2020 000 593.4.
Written Opinion dated Feb. 18, 2021 in related/corresponding International Application No. PCT/EP2020/083604.

* cited by examiner

METHOD FOR OPERATING AN ASSISTANCE SYSTEM

BACKGROUND and SUMMARY of the INVENTION

Exemplary embodiments of the invention relate to a method for operating an assistance system for automated driving operation of a vehicle that follows a determined standard trajectory in a longitudinally and transversely controlled manner, wherein an emergency trajectory is continuously determined, along which the vehicle is brought to a standstill in a longitudinally and transversely controlled manner after activation of emergency operation of the vehicle.

A method and a device for operating a vehicle in automated driving operation are known from DE10 2015 003 124 A1. During a normal function of the automated driving operation, an emergency target trajectory is continuously determined and stored, which is to be used as the basis for an automated trajectory control of the vehicle after the occurrence of at least one predefined fault event. If the occurrence of at least one predefined fault event is detected, an emergency operation mode is activated, in which the automated trajectory control of the vehicle is initiated and carried out according to the emergency target trajectory stored before the occurrence of the at least one predefined fault event for a predefined period of time and/or until the vehicle comes to a standstill, if and as long as the driving of the vehicle is not taken over by a vehicle driver.

Furthermore, DE 10 2017 011 808 A1 describes a method for controlling the movement of a vehicle in automated driving operation and a device for carrying out the method. The automated driving operation is switched from a regular operating mode, in which the vehicle is guided in automated fashion along a regular target trajectory to a predefined target position by means of a main control unit, to an emergency operating mode, in which the vehicle is guided in automated fashion along an emergency operating target trajectory to an emergency stop position by means of an auxiliary control unit, if a functional impairment of the main control unit is detected. In the regular operating mode, the regular target trajectory, the emergency operation target trajectory, and the lane course of a lane travelled by the vehicle are continuously determined in a vehicle axis system of the main control unit. The determined emergency operation target trajectory and the determined lane course are fed to the auxiliary control unit and stored there. In emergency operating mode, the lane course of the lane travelled by the vehicle is determined in a vehicle axis system of the auxiliary control unit. In emergency operating mode, a deviation between the coordinate systems of the main control unit and the auxiliary control unit is compensated for based on the lane course stored in the auxiliary control unit and the lane course of the lane determined by the auxiliary control unit.

Exemplary embodiments of the invention are directed to a method for operating an assistance system for automated driving operation of a vehicle.

A method for operating an assistance system for automated driving operation of a vehicle provides for the vehicle to follow a determined standard trajectory in a longitudinally and transversely controlled manner, wherein an emergency trajectory is continuously determined, along which the vehicle is brought to a standstill in a longitudinally and transversely controlled manner after activation of emergency operation of the vehicle. In accordance with the invention, in the event of an imminent or already initiated lane change of the vehicle from a starting lane of the vehicle to a target lane according to the determined standard trajectory, a decision is made as to whether the vehicle should be brought to a standstill in the starting lane or in the target lane when emergency operation is activated. In other words, it is decided whether the upcoming lane change should be initiated or not, or whether the already initiated lane change should be continued or aborted. The decision is made here depending on the current position of the vehicle on the determined standard trajectory. The vehicle is then brought to a standstill in the starting lane, and thus guided back to the starting lane if the lane change has already been initiated, if a trajectory can be planned as an emergency trajectory, by means of which the vehicle is brought to a standstill in the starting lane within a predefined path length and/or within a predefined time period, and if in the process a predefined comfort value of a transverse acceleration acting on the vehicle is not exceeded and a predefined penetration depth of the vehicle into the target lane is not exceeded.

An imminent lane change is assumed in particular if the determined standard trajectory provides for a lane change within a predefined observation horizon of the vehicle, i.e., if the lane change is planned within a predefined time or route portion.

In the case of an imminent lane change, the term "starting lane" means the lane of the vehicle from which the imminent lane change is initiated, i.e., a current lane of the vehicle. In the case of an already initiated lane change, the term "starting lane" is understood to mean the lane from which the lane change has been initiated. The term "target lane" is understood to mean the lane of the vehicle in which the lane change is to end, if it is not aborted prematurely.

The method represents a fallback solution for emergency operation of the vehicle, for example in the event of a failure of a main control unit of the vehicle, wherein operation of the vehicle, in particular automated driving operation, is possible in such a case to the greatest possible extent without redundant environmental sensors.

Applying the method can substantially ensure that the vehicle in emergency operation is brought to a safe standstill in either the starting lane or the target lane according to the decision made when emergency operation is activated. This can largely exclude the possibility of further vehicles being obstructed in both lanes or even of both lanes being blocked.

It can therefore be largely ruled out that, even if a lane change has already been initiated, the vehicle aborts this abruptly when emergency operation is activated and the vehicle is brought to a standstill or returns to the starting lane if the effective transverse acceleration exceeds the comfort value and the predefined penetration depth into the target lane is exceeded. In this case, the lane change is carried out and the vehicle is steered to the target lane in order to brake the vehicle comparatively comfortably and safely.

A further embodiment of the method provides that the decision as to in which lane the vehicle is brought to a standstill is made taking into account a risk of collision existing in the starting lane and/or the target lane, and the vehicle is brought to a standstill in the lane that is less at risk. The vehicle is therefore braked to a standstill in the lane in which the risk of conflicts and collisions with other road users, in particular with other vehicles, is considered to be comparatively low.

After the planning or initiation of the lane change, in a further development of the method, two emergency trajectories are continuously determined, which bring the vehicle to a standstill in the starting lane and in the target lane respectively within the predefined path length and/or within the predefined time period. In this way, it can be ensured to the greatest possible extent that it is possible to brake the vehicle to a safe standstill both in the starting lane and in the target lane in activated emergency operation.

When the emergency operation of the vehicle is activated, a hazard warning lighting of the vehicle is automatically activated depending on the country in which the vehicle is located, either when the emergency operation is activated or when the vehicle has come to a standstill.

By activating the hazard warning lighting, other road users in the vicinity of the vehicle are made aware of the braking vehicle or the stationary vehicle, so that other road users are given the opportunity to avoid the vehicle in good time.

For this purpose, in particular, a current position of the vehicle is determined based on detected signals of a satellite-based position determination unit, so that the country in which the vehicle is currently located can be determined. If the country is known, it can be determined at what time the vehicle's hazard warning lighting should be activated to draw attention to the vehicle.

If the emergency operation of the vehicle is activated, in particular due to a detected fault, a warning is issued visually, acoustically, and/or haptically in the vehicle, so that a vehicle user and any other vehicle occupants present are made aware of the circumstance inside the vehicle.

In order to secure the vehicle when it has come to a standstill, in a possible development a parking brake is activated and an appropriate gear is selected so that the vehicle is secured against rolling away.

Exemplary embodiments of the invention are explained in more detail below with reference to drawings.

BRIEF DESCRIPTION of the DRAWING FIGURES

Figure 2:
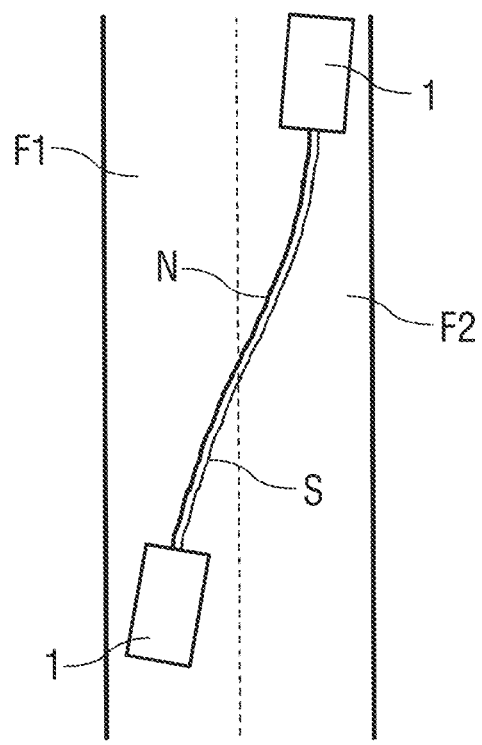
Figure 3:
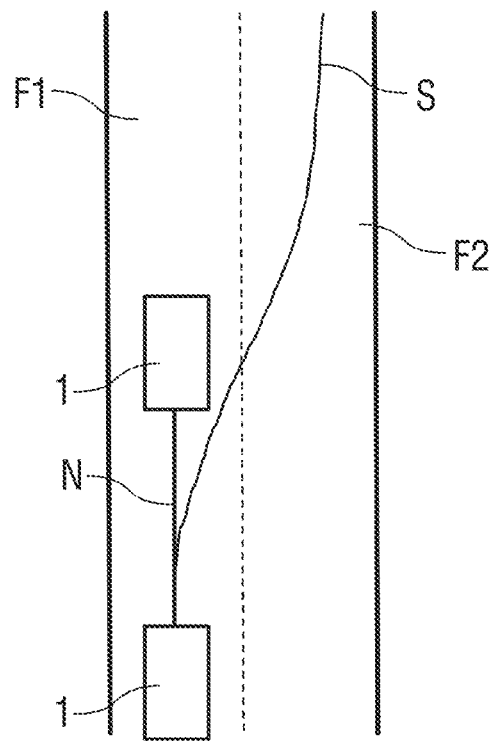
Figure 4:
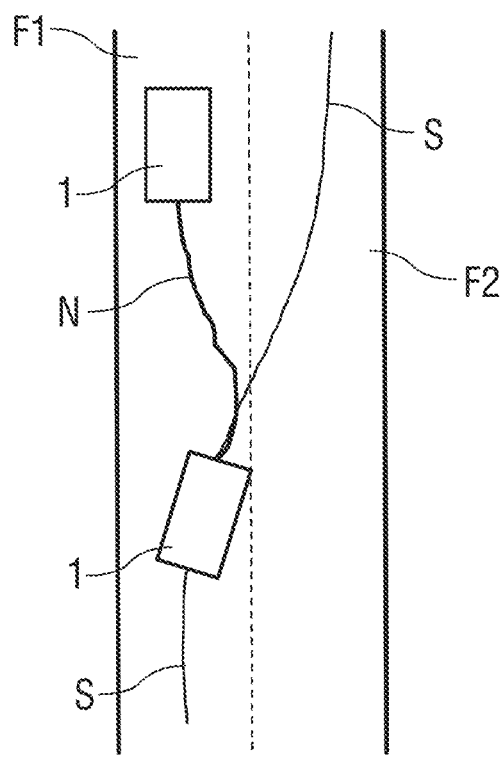

In the drawings:

FIG. 1 shows schematically a driving situation in automated driving operation of a vehicle according to the prior art, FIG. 2 shows schematically another driving situation in automated driving operation of a vehicle according to the prior art, FIG. 3 shows schematically a driving situation of a vehicle driving in automated driving operation when using a method according to the invention, and FIG. 4 shows schematically a further driving situation of the vehicle driving in automated driving operation when using the method according to the invention.

Corresponding parts are provided with the same reference signs in all figures.

DETAILED DESCRIPTION

FIGS. 1 and 2 each show a driving situation of a vehicle 1 in automated driving operation according to the prior art.

To perform automated driving operation, the vehicle 1 has an assistance system that fully performs a driving task when activated.

In automated driving operation, a standard trajectory S is determined, in particular by means of the assistance system, and is predefined for the vehicle 1 and is followed by the vehicle 1 with longitudinal and transverse control.

While the vehicle 1 is following the standard trajectory S, an emergency trajectory N is determined, along which the vehicle 1 is brought to a standstill, in particular a safe standstill, under longitudinal and transverse control after activation of emergency operation of the vehicle 1, for example due to a failure of a main control unit. This emergency operation is activated in particular if a safe continuation of the automated driving operation cannot be ensured.

FIG. 1 shows a driving situation in automated driving operation of the vehicle 1, in which a lane change of the vehicle 1 from a starting lane F1 to a target lane F2 is planned, as shown by means of the planned standard trajectory S.

The course of the emergency trajectory N corresponds to the standard trajectory S, so that the vehicle 1 is braked to a standstill in activated emergency operation as a redundant driving function of the vehicle 1 while the lane change is being carried out. The vehicle 1 is braked here so that it is in both the starting lane F1 and the target lane F2. Other road users could be obstructed as a result, with the vehicle 1 also blocking the starting lane F1 and the target lane F2 when stationary.

In a driving situation of the vehicle 1 shown in FIG. 2, the lane change has already been initiated, however the vehicle 1 is still in its starting lane F1. The course of the emergency trajectory N corresponds to the standard trajectory S, so that the vehicle 1 performs the lane change in activated emergency operation.

The vehicle 1 comprises an environment sensor system, which is not shown, wherein a function of a number of environment sensors of the environment sensor system is also available in the activated emergency operation of the vehicle 1.

The assistance system comprises a main control unit for carrying out the automated driving operation and an auxiliary control unit for controlling the vehicle 1 in emergency operation. During automated driving operation, the main control unit continuously determines the emergency trajectory N to be used in emergency operation and makes this available to the auxiliary control unit. In activated emergency operation, the auxiliary control unit takes over the task of controlling the vehicle 1. Thus, even in the event of emergency operation caused by a failure of the main control unit, the assistance system is able to guide the vehicle 1 to a safe state, in particular a safe standstill, in accordance with the emergency trajectory N previously determined by the main control unit. In general, the auxiliary control unit is designed to be less powerful than the main control unit. In particular, the auxiliary control unit is a control unit for vehicle dynamics stabilization and is designed to process satellite-supported information and acquired signals from a camera on the vehicle as an environment sensor. Using the satellite-supported information, a more precise localization of the vehicle 1 is possible than if the determination of a current position of the vehicle 1 is based on detected wheel speeds.

In the event of a relatively serious malfunction of the automated driving operation of the vehicle 1, for example in the event of a failure of the main control unit, the function of the most necessary environmental sensors is available to the vehicle 1 in activated emergency operation. Such a division enables the vehicle 1 to be controlled even without redundant environmental sensors in the event of a failure of the main control unit or a failure of an auxiliary control unit.

Both the main control unit and the auxiliary control unit of the vehicle 1 are each connected to a driving controller for automated driving operation and for emergency operation, to a device for steering and for braking, and to a number of the environment sensors as well as other sensors.

In emergency operation, the function of at least one sensor, for example in the form of a camera, is available, wherein the starting lane F1 and the target lane F2 are detected based on detected signals, in particular image signals. A detection range of the camera is directed in front of the vehicle 1, and during driving operation of the vehicle 1 signals are continuously detected, by means of which objects and obstacles in front of the vehicle 1 are also detected. This makes it possible to implement a collision-avoiding and/or collision-consequence-reducing measure.

The assistance system attempts to move the vehicle 1 in automated driving operation at a comparatively high cruising speed using detected signals from the environment sensors, wherein the vehicle 1 follows the determined standard trajectory S in a longitudinally and transversely controlled manner.

According to the prior art, the standard trajectory S is used as the emergency trajectory N for activated emergency operation, wherein the vehicle 1 is brought to a standstill with a predefined deceleration profile. In particular, the standard trajectory S and the emergency trajectory N not only provide a set of location coordinates along which the vehicle 1 is guided, but also information regarding a desired speed and acceleration profile along these location coordinates.

If the vehicle 1 performs a lane change according to the standard trajectory S, during which lane change the emergency operation of the vehicle 1 is activated, there is a risk that the vehicle 1 will be brought to a standstill while performing the lane change and thus will come to a stop in the starting lane F1 and the target lane F2, as shown in FIG. 1.

If the vehicle 1 in activated emergency operation, as shown in FIG. 2, follows the standard trajectory S and thus the emergency trajectory N with a deceleration profile reduced in one deceleration and carries out the lane change, then the vehicle 1 is indeed in the target lane F2 as the target lane of the lane change, but this takes place without transverse and rearward object detection. As a result, the vehicle 1 poses a considerable risk to other road users and exposes itself to a comparatively high risk of collision. For example, the target lane F2 can be used by other road users in the region of the vehicle 1 carrying out the lane change, wherein the other road users are not detected or are only detected relatively late. Such a risk increases with the travel time in relation to the predefined emergency trajectory N in the target lane F2.

Usually, a lane change of the vehicle 1 in automated driving operation can take place to a target lane F2, an exit lane not shown in more detail, or to a hard shoulder.

In order to optimize an activated emergency operation of the vehicle 1 during a planned or already initiated lane change in respect of comfort and safety for the vehicle 1 and other road users, a procedure described below on the basis of FIGS. 3 and 4 is provided.

In the automated driving operation of the vehicle 1, two emergency trajectories N are determined after planning or initiating a lane change, wherein the vehicle 1 is brought to a safe standstill along one emergency trajectory N within a predefined path length or within a predefined time period in the starting lane F1 of the vehicle 1. Another determined emergency trajectory N is intended to bring the vehicle 1 to a standstill in the target lane F2 within the predefined path length or within the predefined time period.

According to the exemplary embodiment in FIG. 3, the vehicle 1 follows the determined emergency trajectory N in the starting lane F1, although a lane change to the target lane F2 represented by means of the standard trajectory S is planned. The vehicle 1 is brought to a standstill according to the predefined deceleration profile of the emergency trajectory N.

In particular, the vehicle 1 is brought to a standstill in the starting lane F1 if the emergency trajectory N specifies that the vehicle 1 can be decelerated in the starting lane F1 within a predefined path length or within a predefined time period, without a transverse acceleration acting on the vehicle 1 exceeding a predefined comfort value and without the vehicle 1 having already entered the target lane F2 by a predefined depth, as shown in FIG. 4.

For example, the predefined comfort value in terms of transverse acceleration lies in a range between 0.5 m/s$^2$ and 3 m/s$^2$.

Depending on the transverse acceleration and the penetration depth of the vehicle 1 into the target lane F2 with an already initiated lane change as decision criteria, a corresponding emergency trajectory N is selected and the vehicle 1 is brought to a safe standstill along this trajectory. The selected emergency trajectory N represents a target trajectory for longitudinal and transverse control of the vehicle 1.

By taking into account the image signals of the camera as an environment sensor, it is possible to detect objects on the particular emergency trajectory N that are at risk of collision and that were not detected when the emergency trajectory N was determined. In this way, it is possible to avoid a collision between the vehicle 1 and a potential collision object, for example by braking more strongly. Thus, a speed and/or acceleration curve of the emergency trajectory N is adapted to changing environmental situations. Also, the emergency trajectory N is selected which has a lower collision risk and for which an emergency braking can be avoided as far as possible. Thus, in addition to the transverse acceleration or penetration depth, the emergency trajectory N is selected which has a low or no risk in relation to critical situations. For example, a critical situation may arise due to an obstacle appearing at comparatively short notice, for example another vehicle travelling slowly or crossing paths or a stationary object, located on one of the emergency trajectories N.

Furthermore, the method provides that, when the emergency operation of the vehicle 1 is activated, a warning is output in the vehicle 1, wherein this is output visually, acoustically and/or haptically, for example by activating a reversible seat-belt tensioner.

Depending on the country in which the vehicle 1 is located, a hazard warning lighting of the vehicle 1 is automatically switched on at the time of activating the emergency operation or at the time of stopping the vehicle 1.

In order to determine the country in which the vehicle 1 is located, a current position of the vehicle 1 is detected using a position determination signal from a satellite-based position determination unit. The hazard warning lighting is switched on according to the country and applicable regulations.

In addition, when the vehicle 1 is stationary, a parking brake is automatically activated and a transmission gear engaged for parking in order to prevent the vehicle 1 from rolling away.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS 1 vehicle
F1 lane
F2 neighboring lane
N emergency trajectory
S standard trajectory

The invention claimed is:

1. A method for operating an assistance system for automated driving operation of a vehicle:
   guiding the vehicle along a determined standard trajectory in a longitudinally and transversely controlled manner;
   continuously determining an emergency trajectory along which the vehicle is brought to a standstill in a longitudinally and transversely controlled manner after activation of an emergency operation of the vehicle;
   activating an emergency operation of the vehicle; and
   determining, when the emergency operation is activated, depending on a position of the vehicle on the determined standard trajectory, and whether there is an imminent or already initiated lane change of the vehicle from a starting lane to a target lane according to the determined standard trajectory, whether the vehicle should be brought to the standstill in the starting lane or in the target lane,
   wherein, during the emergency operation, the vehicle is brought to the standstill in the starting lane
   if the emergency trajectory is one in which the vehicle is brought to the standstill in the starting lane within a predefined path length or within a predefined time period, and
   if in a process of bringing the vehicle to the standstill a predefined comfort value of a transverse acceleration acting on the vehicle is not exceeded and a predefined penetration depth of the vehicle into the target lane is not exceeded.

2. The method of claim 1, wherein the determination of whether the vehicle should be brought to the standstill in the starting lane or in the target lane accounts for a risk of collision existing in the starting lane or in the target lane, and wherein the vehicle is brought to the standstill in the starting or target lane depending upon which lane presents less risk of collision.

3. The method of claim 1, wherein, after planning or initiation of the lane change, two emergency trajectories, which bring the vehicle to the standstill in the starting lane and in the target lane respectively within the predefined path length or within the predefined time period, are continuously determined.

4. The method of claim 1, wherein when the emergency operation of the vehicle is activated, a hazard warning lighting of the vehicle is automatically activated depending on a country in which the vehicle is located, either when the emergency operation is activated or when the vehicle has come to the standstill.

5. The method of claim 1, wherein a current position of the vehicle is determined based on detected signals of a satellite-based position determination unit.

6. The method of claim 1, wherein a warning is issued visually, acoustically and/or haptically in the vehicle if the emergency operation of the vehicle is activated.

7. The method of claim 1, wherein when the vehicle has come to the standstill, a parking brake of the vehicle is activated and an appropriate gear is selected.

* * * * *